March 6, 1928.

R. S. SANFORD 1,661,772

BRAKE APPLYING MEANS

Filed Feb. 14, 1927

INVENTOR
Roy S. Sanford
BY
ATTORNEY

Patented Mar. 6, 1928.

1,661,772

UNITED STATES PATENT OFFICE.

ROY S. SANFORD, OF SOUTH BEND, INDIANA, ASSIGNOR TO BENDIX BRAKE COMPANY, OF CHICAGO, ILLINOIS, A CORPORATION OF ILLINOIS.

BRAKE-APPLYING MEANS.

Application filed February 14, 1927. Serial No. 168,065.

This invention relates to brakes, and is illustrated as embodied in novel operating mechanism for a brake on a swivelled wheel, as for example the ordinary front wheel of an automobile.

An object of the invention is to provide a powerful operating mechanism, including a lever extending generally horizontally along the axle (i. e. away from the wheel), in which the length of the camshaft arm or equivalent part operated by the lever is not limited. Preferably also the mechanism is so arranged that it may be adjusted readily to preserve the original position of the end of the lever, with respect to the swivelling axis of the wheel, as the brake-applying arm changes its active position to compensate for wear of the brake.

In one desirable arrangement the lever and arm are connected by a member, such as a link, arranged to be adjusted to vary its effective length, for example by providing it with right and left threaded connection with novel sockets receiving balls integrally formed on the ends of the lever and arm.

Figure 1:
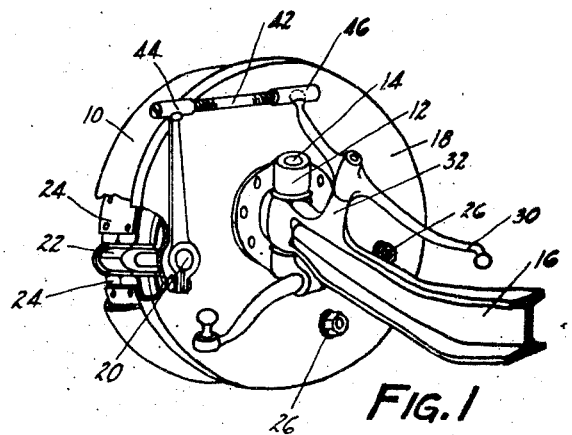
Figure 2:
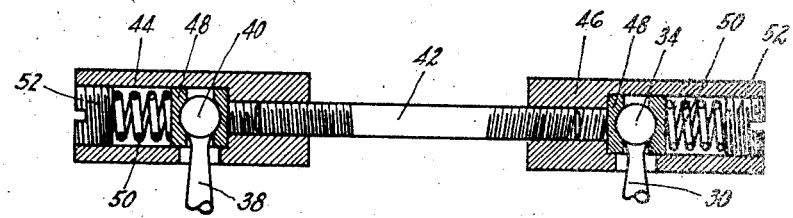

The above and other objects and features of the invention will be apparent from the following description of the illustrative embodiment shown in the accompanying drawing, in which:

Figure 1 is a perspective view, looking toward the front of the car at the left front brake and associated parts; and Figure 2 is a section lengthwise through the novel connecting link.

In the arrangement selected for illustration, the brake includes a drum 10, rotating with a wheel (not shown) on the spindle of the usual knuckle 12 connected, by a king-pin 14 or the like, to one end of the axle 16. At the open side of the drum 10 is arranged a backing plate 18, carrying or furnishing a suitable bearing of any desired character for a shaft 20 forming part of the brake-applying means, and which in this particular arrangement operates a double cam 22 acting on shoes 24.

The particular brake shown is more fully described in Patent No. 1,567,716, granted to Bendix Brake Company on December 29, 1925, on application of A. Y. Dodge. In this particular brake the anchors of the shoes are shown at 26. The present invention relates to the means for applying the brake.

The novel operating means includes a lever 30, fulcrumed between its ends on a boss 32 on axle 16, in such a manner that it extends generally horizontally along the axle, i. e. away from the wheel, with its outer end (formed with an integral ball 34) swinging in an arc crosswise of the swivelling axis of the wheel, that is the axis of the king-pin 14. Preferably the center of ball 34, when the brake is applied, is in or immediately adjacent the swivelling axis.

Lever 30 is intended to operate an arm 38 secured on the end of shaft 20, and shown as terminating at its upper end in an integral ball 40. The connection between the lever and arm is in the form of a member such as a link 42, preferably having right and left threaded connection at its ends with socket devices 44 and 46 embracing the balls 34 and 40.

One desirable construction includes partial socket members 48 held in engagement with one face of ball 34 or 40 by stiff springs 50 confined by threaded plugs 52. These springs are not intended to be compressed during any ordinary brake application, and are therefore quite heavy.

It will be seen that, as the brake wears and the angular active position of arm 38 changes, link 42 can be turned to shorten its effective length, so that the original position of the center of ball 34 with respect to the swivelling axis may be preserved.

While one illustrative embodiment has been described in detail, it is not my intention to limit the scope of the invention to that particular embodiment, or otherwise than by the terms of the appended claims.

I claim:

1. Applying means for a brake on a swivelled wheel comprising, in combination, a lever extending generally horizontally away from the wheel and having its outer end swinging in an arc generally crosswise of the swivelling axis of the wheel, a brake-applying device at one side of the brake, and means connecting the outer end of the lever with said device which is adjustable to preserve the original position of the outer end of the lever with respect to the swivelling axis as the wear of the brake changes the applied position of said device.

2. Applying means for a brake on a swivelled wheel comprising, in combination, a lever extending generally horizontally away from the wheel and having its outer end swinging in an arc generally crosswise of the swivelling axis of the wheel, a brake-applying device at one side of the brake, and a lengthwise-movable member connecting the outer end of the lever with said device and which is adjustable to vary its effective length to preserve the original position of the outer end of the lever with respect to the swivelling axis as the wear of the brake changes the applied position of said device.

3. Applying means for a brake on a swivelled wheel comprising, in combination, a lever extending generally horizontally away from the wheel and having its outer end swinging in an arc generally crosswise of the swivelling axis of the wheel, a generally-vertical brake-applying arm at one side of the brake, and an approximately-horizontal link connecting the outer end of said lever with the upper end of the arm, the effective length of the link being adjustable to preserve the original position of the outer end of the lever with respect to the swivelling axis as the wear of the brake changes the angular position of the arm with the brake applied.

4. Brake-operating mechanism comprising, in combination, a generally-horizontal operating lever having an integral ball at its end, a generally-vertical brake-applying arm also having an integral ball at its end, and a generally-horizontal connecting device having at its opposite ends sockets receiving said balls.

In testimony whereof, I have hereunto signed my name.

ROY S. SANFORD.